United States Patent
Bronnert (10) Patent No.: US 11,125,378 B2
(45) Date of Patent: Sep. 21, 2021

(54) ASEPTIC HIGH TEMPERATURE HEAT EXCHANGER INSPECTION SYSTEM

(71) Applicant: Herve' X. Bronnert, Brookfield, WI (US)

(72) Inventor: Herve' X. Bronnert, Brookfield, WI (US)

(*) Notice: Subject to any disclaimer, the term of this patent is extended or adjusted under 35 U.S.C. 154(b) by 33 days.

(21) Appl. No.: 16/792,594

(22) Filed: Feb. 17, 2020

(65) Prior Publication Data

US 2020/0182392 A1 Jun. 11, 2020

Related U.S. Application Data

(63) Continuation-in-part of application No. 15/449,936, filed on Mar. 4, 2017, now Pat. No. 10,563,935.

(60) Provisional application No. 62/303,744, filed on Mar. 4, 2016.

(51) Int. Cl.
| | |
|---|---|
| F28F 19/00 | (2006.01) |
| F16L 55/40 | (2006.01) |
| H04N 5/225 | (2006.01) |
| F28F 99/00 | (2006.01) |
| F16L 101/30 | (2006.01) |

(52) U.S. Cl.
CPC ............ *F16L 55/40* (2013.01); *H04N 5/2256* (2013.01); *F16L 2101/30* (2013.01); *F28F 99/00* (2013.01); *F28F 2200/00* (2013.01); *H04N 2005/2255* (2013.01)

(58) Field of Classification Search
CPC .... F16L 55/40; F16L 2101/30; H04N 5/2256; H04N 2005/00; F28F 99/00; F28F 2200/00
USPC ........................................................ 165/11.1
See application file for complete search history.

(56) References Cited

U.S. PATENT DOCUMENTS

| | | | |
|---|---|---|---|
| 5,195,392 A * | 3/1993 | Moore | F16L 55/18 138/97 |
| 6,622,934 B1 | 9/2003 | Sanada et al. | |
| 8,471,900 B1 * | 6/2013 | Phelps | H04N 7/18 348/85 |
| 2002/0190682 A1* | 12/2002 | Schempf | G01N 29/265 318/568.11 |
| 2009/0218210 A1 | 9/2009 | Demmons et al. | |
| 2011/0203781 A1 | 8/2011 | Ellingwood et al. | |
| 2014/0110094 A1 | 4/2014 | Durán | |

* cited by examiner

*Primary Examiner* — Davis D Hwu
(74) *Attorney, Agent, or Firm* — Rathe Lindenbaum LLP (57) ABSTRACT

An inspection system for a heat exchanger having a vision system to obtain an image of an inner surface of the at least one tube.

20 Claims, 6 Drawing Sheets

ASEPTIC HIGH TEMPERATURE HEAT EXCHANGER INSPECTION SYSTEM

CROSS-REFERENCE TO RELATED PATENT APPLICATIONS

This application is a continuation-in-part of U.S. application Ser. No. 15/449,936 entitled ASEPTIC HIGH TEMPERATURE HEAT EXCHANGER INSPECTION SYSTEM filed on Mar. 4, 2017 and claims the benefit of U.S. Provisional Application No. 62/303,744 filed on Mar. 4, 2016 and entitled HEAT EXCHANGER INSPECTION SYSTEM the entirety both of which are incorporated herein by reference.

BACKGROUND

The present invention relates generally to the field of heat exchangers and more particularly, to a system for inspecting the inner surfaces of a heat exchanger found on a tubular aseptic or high temperature system for processing low acid products.

Low acid products, such as, milk, cream, ice cream mix, nutritional drinks, dairy alternative drinks, puddings, cheese sauce, soups, dips and sauces are susceptible to the formation of deposit on the heating surface during processing. The formation of deposit which denatures with time and temperature become "burn-on". This is a common problem found on any aseptic processing system, which shortens processing time and can negatively affect the product color, flavor and quality. This invention enables inspection of the inner surfaces of the heat exchanger at the critical point where deposit might occur in case of any or accidental or undesirable event.

DETAILED DESCRIPTION OF THE EXAMPLE EMBODIMENTS

Figure 4:
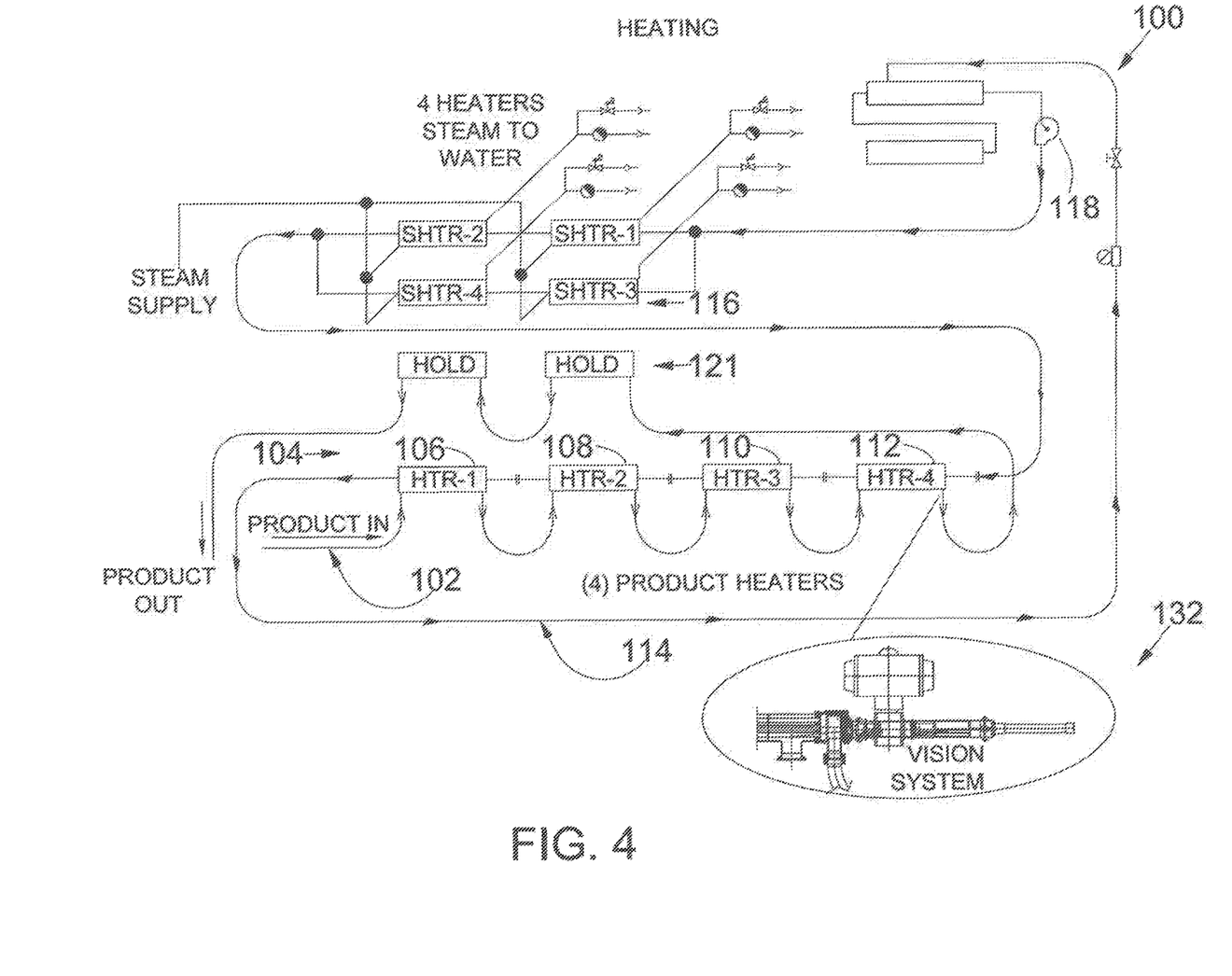
FIG. 4 is a schematic view of a heat exchanger with an inspection system.

Referring to FIG. 4 in one embodiment a heat exchanger 100 for processing food product includes a first path 102 for moving a food product through a series of heat exchangers 104. In one embodiment product is pumped through a first heat exchanger 106, a second heat exchanger 108, a third heat exchanger 110 and a fourth heat exchanger 112. However, the number of heat exchangers may be fewer than four or greater than four.

In a second path 114, heated water is pumped by pump 118 through a series of steam heaters 116 until the temperature of the water is raised to the desired temperature. In one embodiment, the temperature of the water in the second path is about 290 deg. F. The heated water is pumped by pump 118 under pressure through each of the heat exchangers 106, 108, 110 and 112. In one embodiment heat exchanger 112 is the last heat exchanger before the food product being processed is transferred to a holder or container 121. The hot water being pumped through the second path 114 flows in a direction opposite to the direction of the flow of the food product. Accordingly, in one embodiment the temperature of the water will be slightly hotter in the last heat exchanger 112 than in the first heat exchanger 104. Note that the last heat exchanger 112 is the last opportunity for the food product to be heated. The first heat exchanger 106 is the first time that the food product in the first path 102 is being heated by the hot water.

Figure 1:
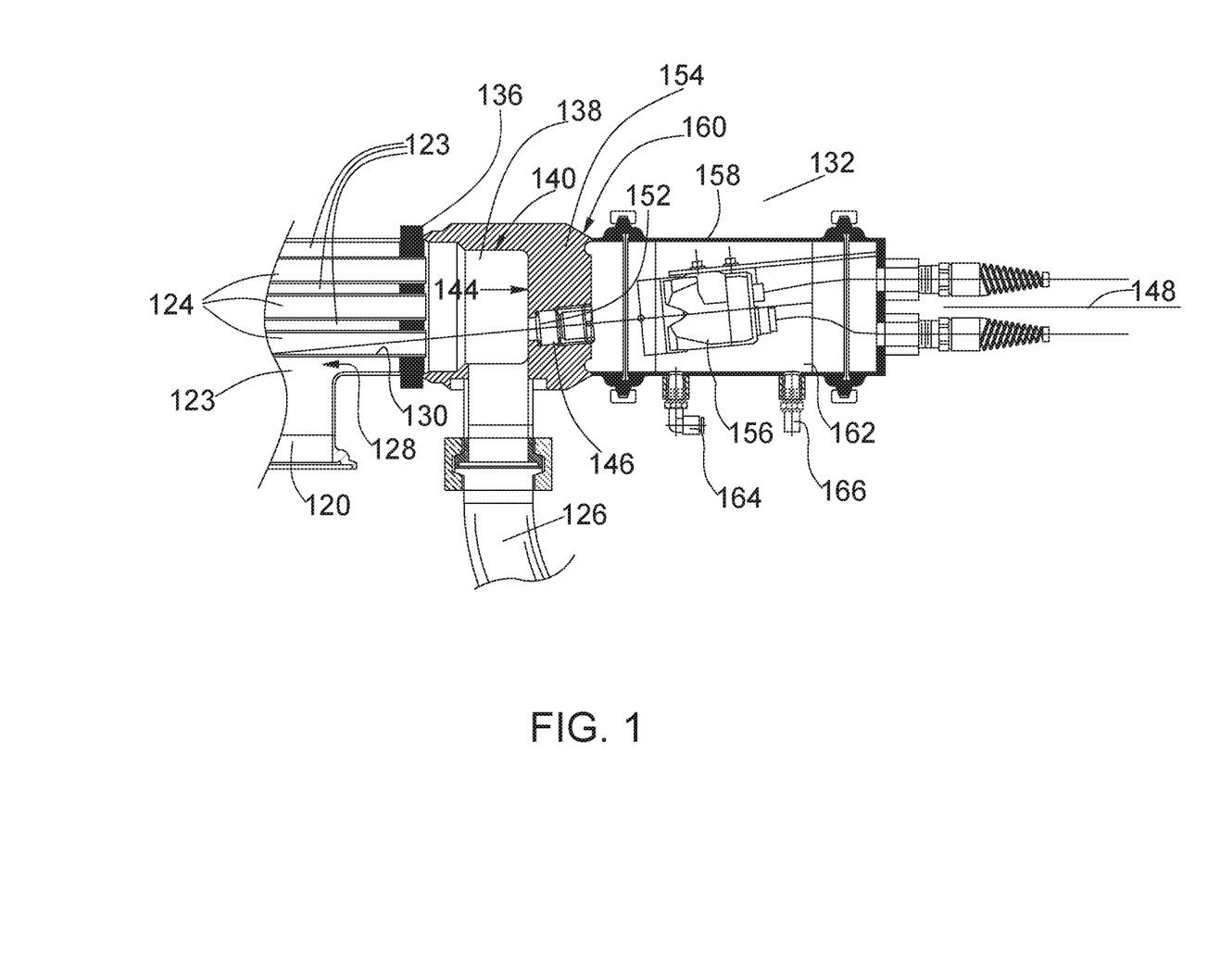
FIG. 1 is a partial cross section of an inspection system for a heat exchanger system.
Figure 2:
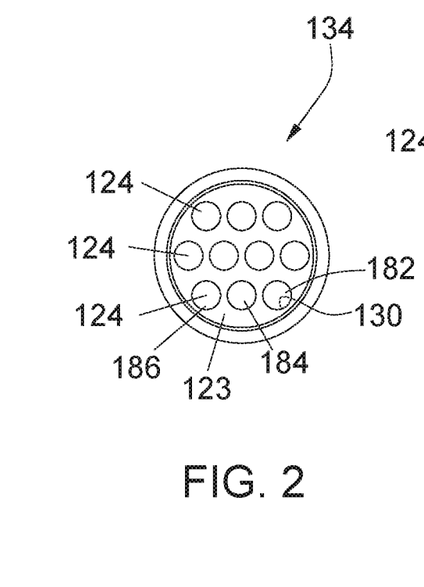
FIG. 2 is a cross section of a portion of the heat exchanger of FIG. 1.

Since the water will be hottest when the hot water enters heat exchanger 112 this is the area where one would expect there to be a deposit of the food product or burn on if any. Referring to FIG. 1 and FIG. 2 the hot water enters each heat exchanger through connection 120 and flows in a direction 122 around the tubes 124 in region 123 thereby heating the food product. The food product flows in a direction opposite to direction 122 of the hot water flow and exits the heat exchanger via conduit 126. The region 128 of tubes 124 is the area in which the hot water first contacts the tubes 124 in the direction that the hot water flows. The water will be hottest at this point since it will be transferring the heat from the water to the food product through the heat exchangers. Accordingly, region 128 in the last of the heat exchangers will be heated to the highest temperature of all the heat exchangers. It is believed that region 128 in which the hot water enters heat exchanger 112 is the hottest that the water will be in all the heat exchangers and therefore the region in which tubes 124 will reach the highest temperature during the heat transfer process. Region 128 of the last heat exchanger 112 is where the hot water first begins to transfer heat to the food product and it is the location in which the food product is last heated. Accordingly, region 128 is the location where a deposit or burn on is likely to take place if it is going to be anywhere within the system. Inspection of the heat exchanger system at this location for any food deposit or burn on can be identified before further processing the tubular aseptic or high temperature system for processing low acid products. If there is no deposit or burn on in the last heat exchanger 112 then there is likely to be no deposit or burn on anywhere in the system.

Referring to FIG. 1 and FIG. 2 heat exchanger 112 includes an outer housing tube member 134 defining an internal region 123 through which the hot water flows around the plurality of inner tubes 124. The hot water enters the region 123 of outer tubing member 134 via an inlet port 120. Outer housing tube member 124 includes a tube sheet member 136 at a terminal end of the outer tubing member that prevents water from entering the product outlet region 138 which is defined by structure 140 having a terminal end wall 144 defining a product contact surface 144. Extending from structure 140 is food product outlet 126 through which food product exits the heat exchanger.

To avoid confusion the term last heat exchanger refers to the last of the heat exchangers through which the food product is heated in the direction that the food product flows through the first path. The last heat exchanger is the heat exchanger that the hot water first enters along the second path that flows opposite to the first path.

In one embodiment, the tubular aseptic or high temperature system processing for low acid products allows for inspection of the inner surface 130 of the inner tubes 124 of a tubular heat exchanger without operator manual intervention. Inner surfaces 130 is the surface of the tubes 124 that directly contact the food product that is being pumped through the tubes 124. In one embodiment, an automatic optical/electronic photographic system 132 connected to a PLC and operator interface or equivalent such as a digital display allows the display of the inside surface 130 of inner tubes 124 of the first path to allow for surface inspection of the inside surfaces 130 of at least one of the heat exchangers. A PLC as used herein is a programmable logic controller that includes a digital processor that through software instructions obtains the digital image from the digital camera and transfers the image data to the display. The PLC may also open and close a valve and move the housing supporting the digital camera as explained herein below. In one embodiment, a user does not need to disassemble any portion of the first path to allow internal viewing of the inner surface 130 of the tubes 124 in the first path 102 through which the food product travels.

Inspection takes place where the heating media comes in, generating the maximum temperatures difference where more deposit is likely to form and deposit and burn on occur. The inspection of the heat exchange tube inside surface is when the system is filled with clear and clean water. This is after CIP (clean-in-place) and after final rinse when the tubular processing system is standing without flow. In one embodiment inspection of the internal surface 130 of the tubular members 124 of path 102 is conducted after the tubes 124 have been cleaned and are filled with clear clean water.

A transparent mounting assembly 146 is secured to the contact surface 144 of structure 140 to optically couple the transparent mounting assembly 146 to the product outlet region 138 of structure 140. Transparent mounting assembly 146 allows for the inspection of the surface 130 of at least one inner tube 124 in region 128 of the heat exchanger. Heat exchanger 112 includes a longitudinal axis 148 that extends the length of the heat exchanger tubes and is centrally located within tubular housing 134. Transparent mounting assembly 146 has a longitudinal axis 150 that that is not concentric with and not parallel to the longitudinal axis 146 of the heat exchanger. Longitudinal axis 150 is set to intersect surface 130 of one of the tubes 124 in region 128. In one embodiment, the tube 124 that longitudinal axis 150 intersects is one of the inner tube 124 that is closest to inlet 120 of the hot water.

A transparent member 152 separates an aseptic reducer 154 that defines structure 140 to allow a vision sensor 156. Vision sensor may include a digital camera to obtain images of the inner surface 130 of a tube 124 in region 128. Vision sensor 156 may also include a light source to illuminate the inner surface 130 to allow the digital camera to obtain an image of the inner surface 130 that may be transmitted to a digital display for visual examination by a user.

Referring to FIG. 1 inspection system 132 includes a housing 158 that is removably coupled to the aseptic reducer 160 which allows the installation of a high temperature transparent "window" 152 in line with the heat exchanger end tubing. In one embodiment, the high temperature transparent window may be formed materials that withstand the high temperatures of 290 degrees F. that are known in the art are also contemplated. This "window" is tilted to allow inspecting the internal surface of the tubes at an angle. A chamber 162 with air cooling is formed to place in line with the window and autofocus vision sensor which takes a picture transferred to a PLC display. This sensor has its own illumination to take pictures in this dark setting. The housing 158 may be disconnected or opened for any mounting and servicing of the vision sensor 156 that may be needed.

Referring to FIG. 1 chamber 162 is cooled with air that enters through inlet port 164 and exits through outlet port 166. The air may air have a temperature that is less than the temperature of the hot water being pumped through second path 114.

Figure 3:
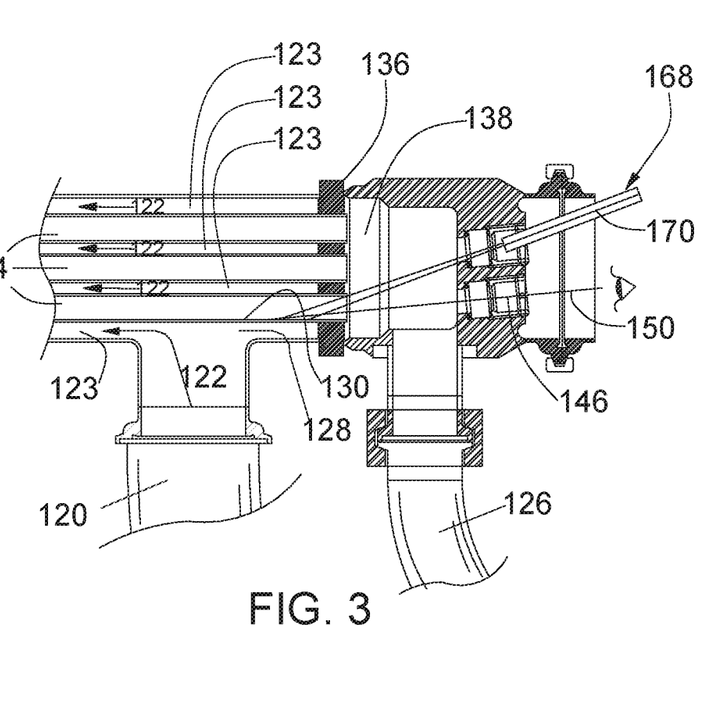
FIG. 3 is a partial cross section of an inspection system for a heat exchanger system with manual inspection.

Referring to FIG. 3, a manual inspection port 168 may extend through housing 158 to allow an operator to view the inner surface 130 of tube 124 without the use of a digital camera or in addition to the use of a digital camera. The line of sight of the manual inspection port 168 extends along a longitudinal axis 170 that intersects the inner surface 130 of at least one tube 124. The manual inspection port 168 in one embodiment has its own illumination light source to light up the internal surface 130 of tube 124. The longitudinal axis 170 is non-parallel to and non-coincident with the longitudinal axis 148 of heat exchanger 112. In one embodiment, the only inspection port is the manual inspection port 168. However, in one embodiment manual inspection port 168 is in addition to digital transparent mounting assembly 146. In this embodiment, the manual inspection port may be used in conjunction with or independently of the digital inspection port 146. In the embodiment in which there is both the manual inspection port that allows a user to view through a conduit the inner surface 130 of tube 124 in region 128 as well as the digital transparent mounting assembly 146 the longitudinal axis 170 is not parallel to or coincident with the longitudinal axis 150 of the assembly 146. Additionally, in one embodiment longitudinal axis 170 intersects surface 130 at the same point as longitudinal axis 150 intersects surface 130. In this manner, it is possible to directly view surface 130 at the same point as the digital display showing the digital image from the digital camera 156.

In one embodiment, longitudinal axis 170 intersects surface 130 at a different same point than the intersection point of longitudinal axis 150 and surface 130. In this manner, it is possible to observe different areas on surface 130 of tube 124.

Figure 5:
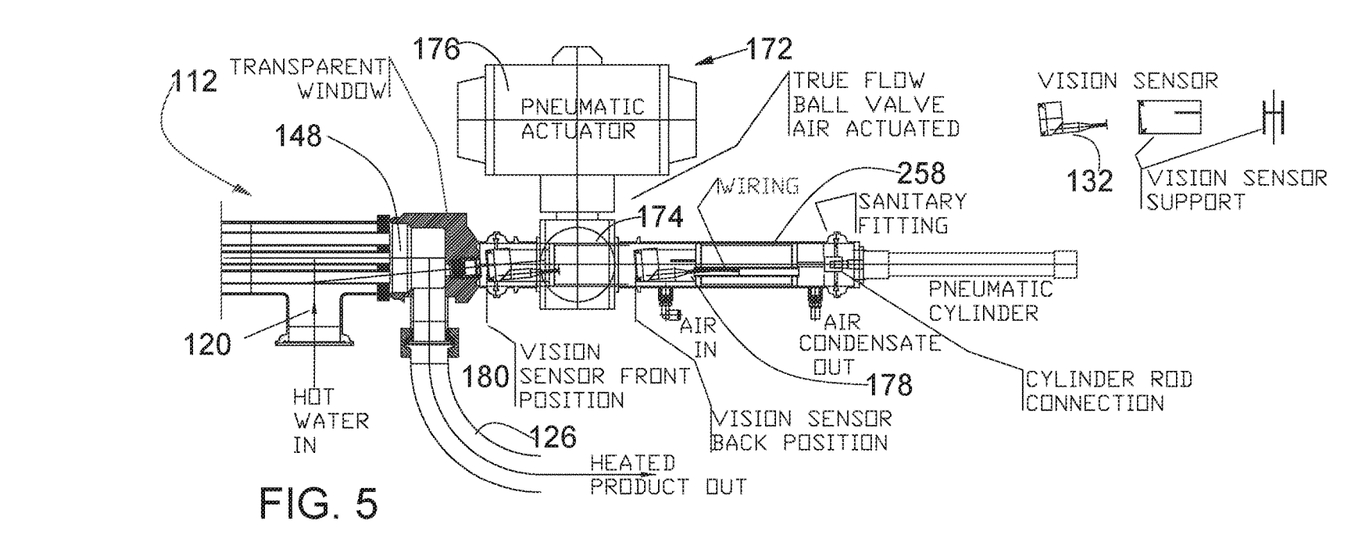
FIG. 5 is a partial cross section of a movable inspection system for a heat exchanger system.

Referring to FIG. 5 vision system 132 includes a heat shield system 172 that provides a thermal and radiation shield between heat exchanger 112 and vision system 132. Heat shield system 172 includes a ball valve 174 being movable between a closed position and an open position. In closed position the ball valve is positioned such that the region between a housing or also referred to herein as a movable carriage 258 and heat exchanger 112 is blocked by the ball valve. In the open orientation of the ball valve the valve is in the open position allowing at least a portion of movable carriage 258 to extend there through to move the digital camera in to the position in which a digital image of the inner surface 130 may be obtained. The movement of the valve between the open position and closed position may be accomplished with an actuator 176 that may be automatically opened and closed in coordination with the movement of movable carriage 258 and the taking of the digital pictures of surface 130. As in the non-moving housing embodiment illustrated in FIG. 1 and FIG. 3 and discussed above, movable carriage 258 has an air cooling system in which air enter inlet 164 and exits outlet 166 to cool the chamber 162 while the digital camera is in the in-use position. Movable carriage 258 in this embodiment is moved along its longitudinal axis between an in-use position and a retracted position through the ball valve by a pneumatic drive. However other drive mechanisms are contemplated. In one embodiment, the movement of the ball valve, movement of movable carriage 258 and the capture of the image of surface 130 by digital camera are all automated through a series of steps by directions from a controller. Referring to FIG. 5 container 258 is shown in a withdrawn position at position 178 and in an in-use position 180. Movable carriage 258 supports a digital camera 156. In all other respects movable carriage 258 and digital camera 156 operate as described above with respect to FIG. 1 and FIG. 3. The in-use position 180 is a front position in which digital camera 156 is in position to obtain an image of surface 130. The non in-use position or retracted position 178 may also be referred to as a rear position.

Movable carriage 258 in one embodiment extends along a rail 181 within a groove 188 to help provide proper alignment of digital camera 156.

In one embodiment, digital camera 156 has a field of view that captures the inner surface 130 of more than one tube 124. Referring to FIG. 2, digital camera 156 in one embodiment captures the inner surfaces 130 of tubes 182, 184, 186 all of which have been commonly referred to as tube 124. As used herein tube 124 can be understood to describe an individual tube or more than one tube.

In one embodiment, the vision sensor provides automatic focusing and exposure time and illumination are adjusted automatically. The camera adjusts and stabilizes the LED light illuminating the internal surface area of the inner tubes of a heat exchanger. A heat exchanger may have one or more inner tubes. The vision sensor illuminates the targeted area to take a picture, transfer it to the PLC using Ethernet then the PLC transfers it to an operator interface for showing the pictures on a screen such as a digital display screen.

The vision camera is set at a specific angle with the tube's internal diameter to see if a deposit has formed. If a deposit has formed, another clean in place operation with caustic and acid must be done. After doing another CIP, the internal diameter of the tubes are reexamined using the vision sensor to confirm that the tubes are free of deposit before processing. To be free of deposit can increase productivity, product quality and flavor.

Figure 7:
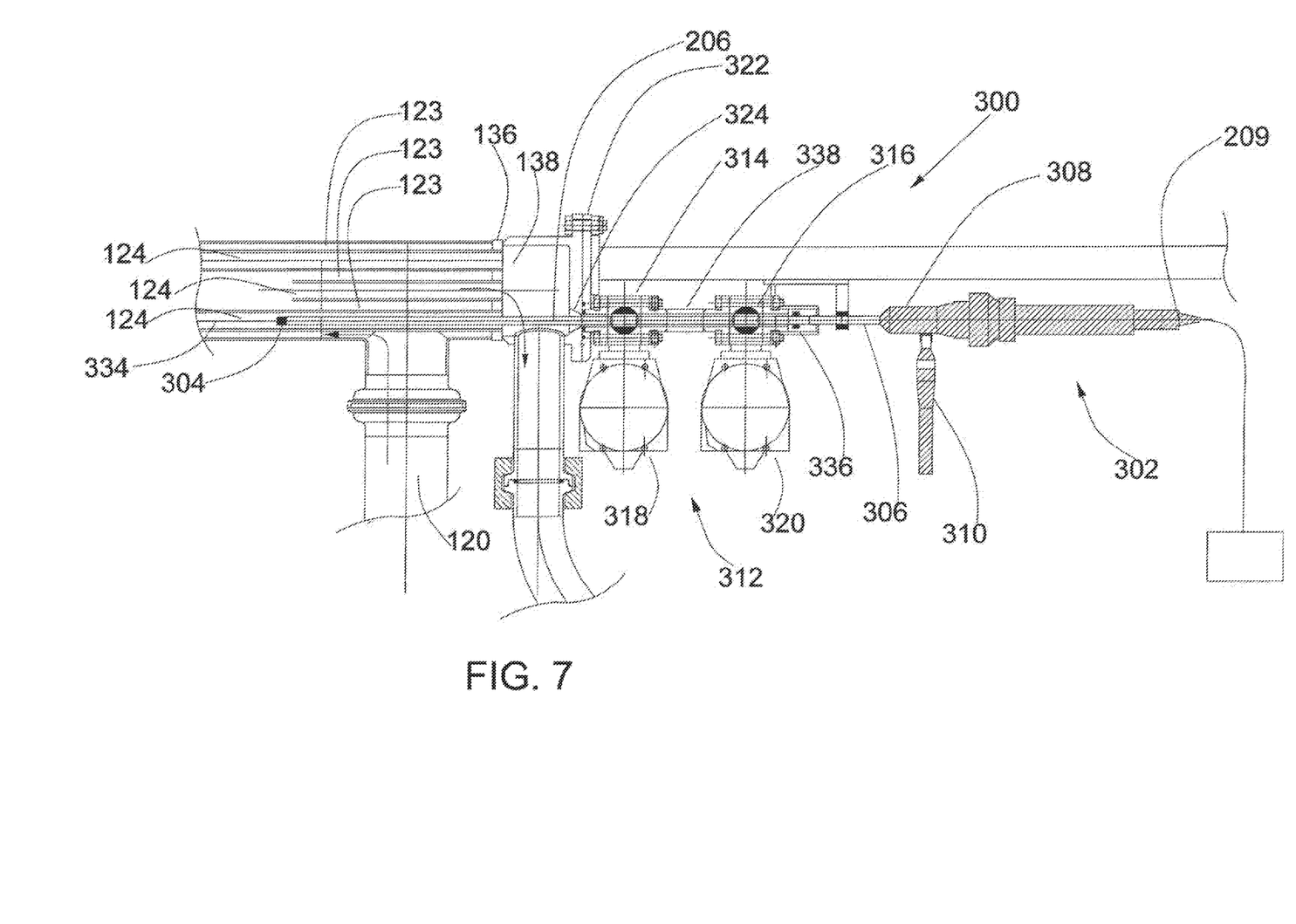
FIG. 7 is a partial cross section of another movable inspection system for a heat exchanger system.
Figure 8:
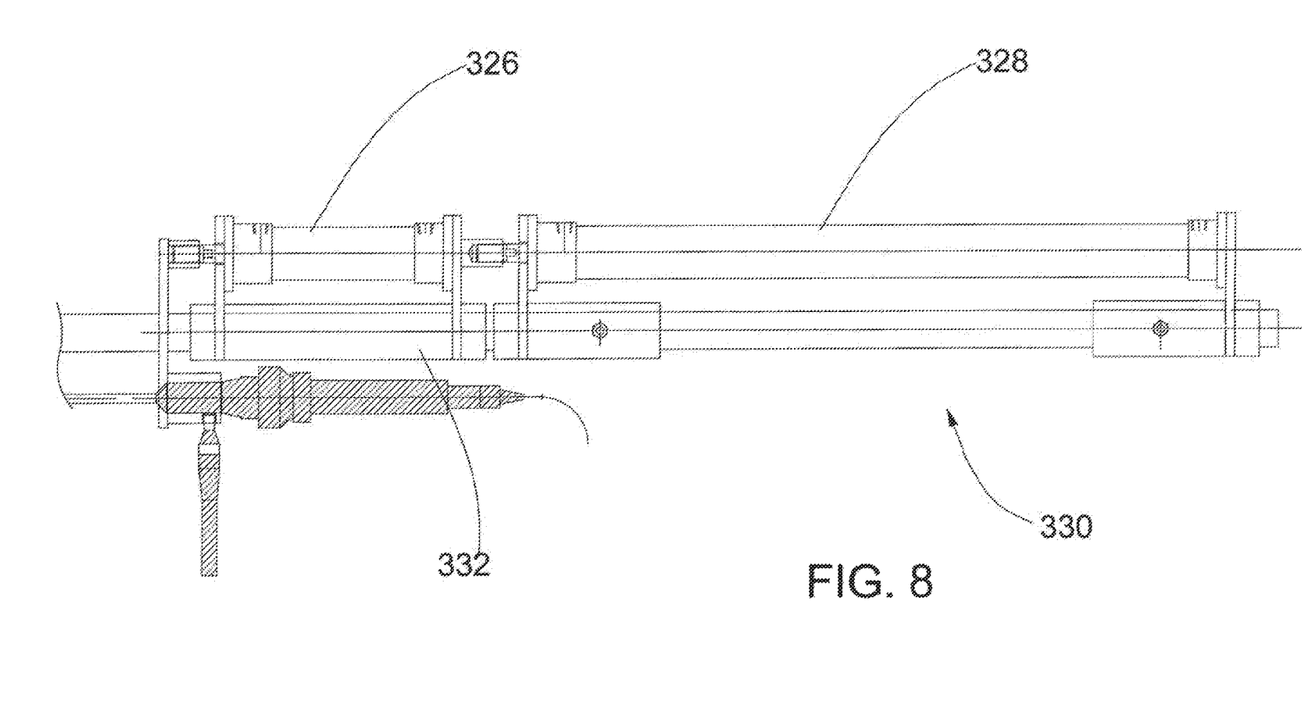
FIG. 8 is a further view of the movable inspection system including the camera and carriage of FIG. 7.
Figure 9:
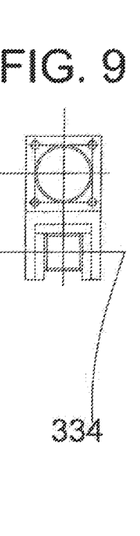
FIG. 9 is an end view of a portion of FIG. 8.

Referring to FIG. 7, FIG. 8 and FIG. 9 a vision system 300 operates to inspect heat exchanger 112 described herein above. A camera 302 includes an optic element 304 that is removably introduced into the hollow region defined by the inner wall of one of the plurality of the inner tubes 124 (see FIG. 2). In one embodiment the inner tube 124 that optic portion 304 is removably introduced in the heat exchanger tube closest to hot water inlet port 120 through which hot water enters outer tube 134. In one embodiment optic portion 304 is connected to a tube such as a borescope 306 that is removably received within heat exchanger 112 between an inserted position and a withdrawn position. The optic portion 304 is positioned within inner tube 124 when the borescope is fully inserted into heat exchanger 112 and is withdrawn from inner tube 124 and the aseptic reducer 138 when the borescope is fully withdrawn from heat exchanger 112.

Inner tubes 124 have a terminal open end that is in fluid communication with aseptic reducer that allows the material within inner tubes 124 to exit the heat exchanger. The terminal open end of inner tube 124 is adjacent tube sheet 136 that blocks the hot water fluid from exiting the heat exchanger through the aseptic reducer. Tube sheet 136 keeps the product within inner tubes 124 separate from the hot water used to heat the product within inner tubes 124. In one embodiment a region adjacent the terminal ends of inner tubes 124 are welded to tube sheet 136.

Camera 302 includes a camera body 308 operatively connected to a borescope 306. A light source 310 is operatively connected to borescope 306 to provide illumination inside of inner tube 124 sufficient that optical element 304 can obtain an image of the inside of the inner tube 124 including a region of the inner wall of inner tube 124.

An interface 312 separates the camera 302 from the inner channels of heat exchanges 112. A first ball valve 314 and a second ball valve 316 act to separate the inner cavity of heat exchanger from camera 302. First ball valve 314 and second ball valve 316 are actuated between an open position and a closed position by first actuator 318 and second actuator 320 respectively. As described herein in one embodiment actuators 318 and 320 are air actuators that are controlled by a PLC, though other type of actuators know in the art may be used as well. Interface 312 is sealingly connected to aseptic reducer 138 via a flange 322. Interface 312 includes a channel through which borescope 306 travels into and out of aseptic reducer 138 via an opening 324 extending through a wall of aseptic reducer 138.

Referring to FIG. 7, FIG. 8 and FIG. 9 camera 302 and borescope 306 are moved along a longitudinal axis 334 by first and second pneumatic actuation cylinders 326 and 328 which are mounted on and guided by square tubing 330. Second pneumatic actuation cylinder 328 is mounted on top of square tubing 330 with two adapters. Second cylinder 328 is fixed relative to square tubing 330. First actuation cylinder 326 is mobile and has a mobile carriage 332. Camera 302 is connected to the end of second cylinder 326. A power supply is connected to camera 302. Pictures taken by camera 302 is transferred via a USB converter for the video output from the camera 302 and using software can be seen on a viewer, such as, a laptop or other monitor. In one embodiment longitudinal axis 334 is co-linear with the longitudinal axis of the inner tube 124 that the optical element 304 enters.

The PLC is programmed to time and sequence the inspection procedure and is done at the proper time. The proper time to inspect the tubes is after CIP (clean-in-place), at the end of the water flushing the system when the system is full of clear water and there is no pressure and no flow. The inspection procedure begins as the small cylinder's 326 piston rod moves forward a few inches, the borescope's optic element 304 engages an o-ring 336 to seal the borescope to prevent water from aseptic reducer 138 from coming out. Then, the two ball valves 314 and 316 both open using air actuators 318 and 320 respectively. Next, the long cylinder's 328 piston rod moves forward many inches and the borescope's optic element 304 is inside the inner tubing 124 of the heat exchanger. The camera takes a series of pictures as the distal portion of borescope 306 extends inside of the inner tube 124 reaching many inches of vision. The camera 302 takes pictures of the internal surface of one tube 124. In one embodiment inner tube 124 is one of the inner tubes 124 that is closest to the entry of the hot water region. These inner tubes that are closest to the hottest water are the most likely to have a deposit formed on their inner wall and therefore the ones to inspect. The camera transfers pictures to the USB converter which are then transferred to a viewer, such as, a laptop where the pictures can be seen using software on the viewer. In one embodiment pictures are taken as the borescope is inserted into the inner tube 124. In one embodiment pictures are taken as the borescope is withdrawn from a fully inserted position to a fully withdrawn position. In one embodiment pictures are taken both as the borescope is inserted and as the borescope is withdrawn.

After the PLC retracts the borescope and if the inner tube 124 shows no deposit as confirmed by looking at the pictures, the procedure is to flush the system, close the loop and sterilize the system in a closed loop. Upon completion of sterilization, the product is introduced. The vision system does not touch the heat exchanger at all during this time.

After the PLC retracts the borescope, if deposit is discovered as confirmed by looking at the pictures, a complete CIP (clean-in-place) must be done and a second inspection would be done to confirm that there is no deposit. It is important to confirm "no deposit" before processing with an aseptic system for Borescope penetrates the heat exchanger reaching inside of the tubing 124 without losing water and preventing air from entering. In this manner one can obtain a direct picture of the inside of the tube 124 and an extended view of the tube 124. This vision system enables an objective inspection of the internal diameter (ID) of the tube and does not depend upon operator intervention to set up or operate.

In one embodiment borescope includes a rigid type rod which goes directly into the tube 124 to be inspected. The borescope's rigid optical rod is part of a video/camera system equipped with a red light and charger. The video camera sends the picture taken to a USB converter which is connected to a laptop or viewing device for viewing. The rigid rod with optical tip and its video camera is attached to the first air cylinder. It is coupled with a second one.

Both cylinders allow the borescope to be introduced in two (2) steps inside the two (2) ball valves which are the gates between the outside and the inside of the heat exchanger. The borescope is sent into the heat exchanger only after the processing, cleaning and rinsing of the processing system is done. Temperature is not a problem.

In one embodiment, in a first step the borescope rod is introduced in a seal sealing the rigid rod. In a second step, the borescope rod moves inside of the two (2) ball valves inside the bottom of the fractional tubing and is in the tubing for several inches or more. As noted above the borescope rod is introduced through the aseptic reducer and into the inner tube 124 without loss of water or air entering the heat exchanger.

The borescope is fitted with an optical element at its distal end that sends a picture or video/picture to the camera which is connected to a converter which sends the picture to a laptop or viewing device.

The borescope rod is retracted by steps. First to the seal, the two ball valves close, then the rod backs up further to a supporting guide 336. Water is not lost. Air does not enter the heat exchanger or aseptic system.

Figure 6:
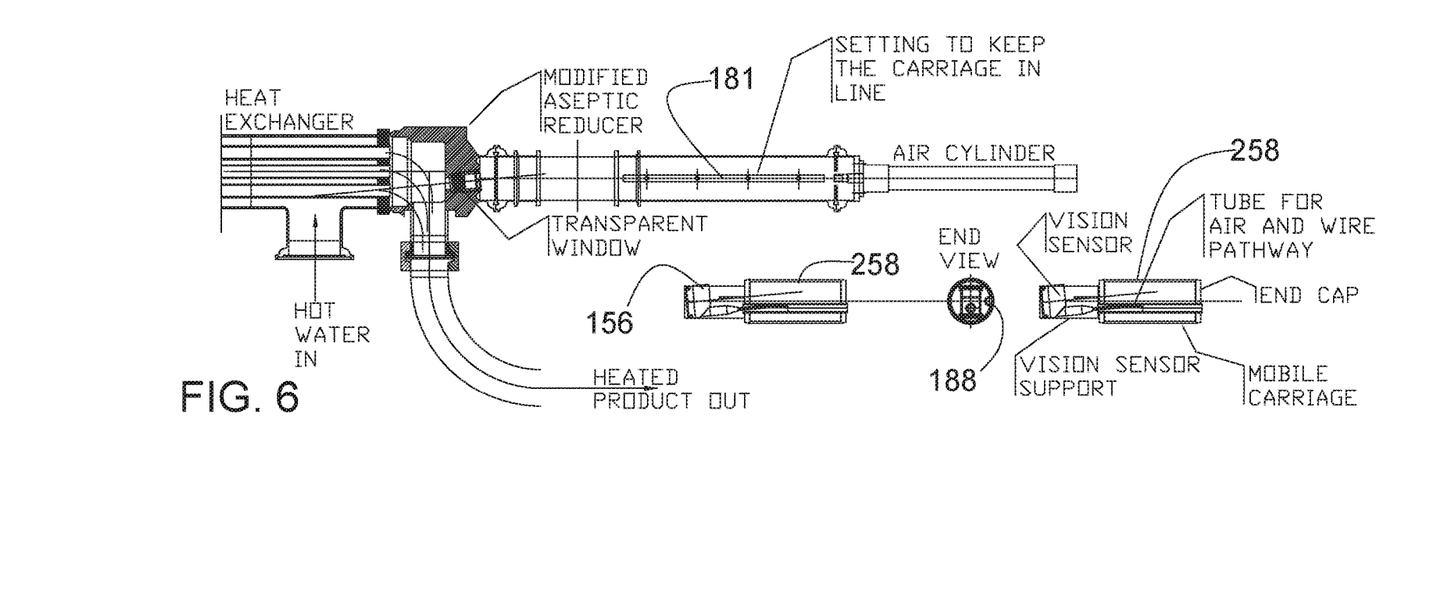
FIG. 6 are other views of the movable inspection system of FIG. 5.

With the system illustrated in FIG. 6 and FIG. 7 and described herein a single or multiple tube in a tube heat exchanger is slightly modified. It is constructed as a heat exchanger up to and including the tube sheet 136. At the tube sheet 136 an aseptic reducer tee is welded to the tube sheet at one end and is bolted on the other end which is in alignment with the heat exchanger. The flange 322 supports the two air operated high pressure ball valves 314, 316. These valves are welded together with a spacer 338 and have one extension with a seal. The borescope's rigid optical rod is part of a video/camera.

Referring to FIGS. 7-9 borescope 306 extends inside the heat exchanger tube 124 is used during the non-aseptic time and is used to inspect one tube closest to the incoming heat source 120 which is the one more likely to deposit first and so is the one to inspect. Borescope 306 retracts from the heat exchanger tube after inspecting the heat exchanger, so that nothing conducts heat to the optical element. Borescope 306 is an assembly of optical element 304, illuminating light. Borescope includes a cable, power supply 310 and rod which enable viewing all around the inside of the heat exchanger tubes and sending what it sees to the camera. An o-ring seals the end of the borescope tube so no air can enter or water is lost. At the end of CIP rinsing, the o-ring seals the end of the borescope tube, then two valves open so no air can enter and no water is lost. The borescope extends inside of the heat exchanger tube and its optical element takes pictures as it moves forward several inches inside of the heat exchanger. The borescope also takes pictures as it retracts and stops when it is out of the heat exchanger tube.

Referring to FIGS. 7-9 two ball valves maintain aseptic conditions in the aseptic reducer during product operation and sterilization. The first valve 314/318 is at sterilizing temperature during sterilization or when product flows to the holder. The first valve is at sterilizing temperature and transfers this temperature to the water in between the two valves. The first valve is at sterilizing temperatures on both sides. It has aseptic conditions on one side and sterile water on the other side. The second valve 316/320 is in contact with the high temperature of the water in between the two valves which maintains the first valve aseptic. This area is sterile during processing and sterilization.

The two ball valves close after boresope 306 retracts so that the optical element is not inside the heat exchanger tube and does not touch the heat exchanger when processing product, to maintain the aseptic condition.

Referring to FIGS. 7-9 a USB converter transfers the camera's digital image to a viewer, laptop or monitor.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The features described herein may be combined in any combination and such combinations are contemplated. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An apparatus comprising:
   a heat exchanger having a plurality of inner tubes located within an outer tube;
   a camera having an optical element removably received within one of the inner tubes;
   a mobile carriage supporting and moving the optical element between an in-use position within one of the inner tubes and a non in-use position outside of the inner tube;

a first valve movable between an open orientation and a closed orientation, wherein the mobile carriage moves the optical element through the first valve when the first valve is in the open orientation, the first valve sealing the heat exchanger from the camera when the first valve is in the closed position and the first valve is intermediate the optical element and the inner tubes;

a light source illuminates an internal surface of one of the inner tubes proximate to the hot water inlet port when the optical element is in the in-use position, and the camera obtaining an image of the illuminated internal surface.

2. The apparatus of claim 1, wherein the image of the internal surface of the inner tube is the inner tube that is closer to the hot water inlet port than at least one other inner tube.

3. The apparatus of claim 2 wherein the mobile carriage moves the camera along a longitudinal axis between an in-use position and a retracted position.

4. The apparatus of claim 3 wherein the valve is a ball valve and blocking the movable carriage from the heat exchanger when the movable carriage is in the retracted position and the ball valve in in the closed orientation.

5. The apparatus of claim 4 wherein carriage moves along a longitudinal axis parallel to and offset from the longitudinal axis of the heat exchanger.

6. The apparatus of claim 1 wherein the heat exchanger includes at least two heat exchangers in series including at least a first heat exchanger and a last heat exchanger, wherein a product to be heated is pumped though inner tubes of the first heat exchanger to the inner tubes of the last heat exchanger, and wherein the hot water is pumped first through the last heat exchanger and then through the first heat exchanger, wherein the image of the illuminated internal surface of one of the inner tube is obtained in the last heat exchanger.

7. An apparatus comprising:
a heat exchanger having a plurality of inner tubes located within an outer tube, wherein one of the plurality of the inner tubes is closest to a hot water inlet port through which hot water enters the outer tube;
a camera having a field of view;
a mobile carriage supporting and moving the camera moving from a first in-use position to a second non in-use position;
a valve movable form a closed orientation to an open orientation, wherein a portion of the mobile carriage moves the camera through the valve from the non in-use position to the in-use position, the camera being in the in-use position when the valve is in the open orientation and in the non in-use position when the valve is in the closed orientation;
a light source illuminating an internal surface of one of the inner tubes proximate to the hot water inlet port, and the camera obtaining an image of the illuminated internal surface.

8. The apparatus of claim 7 wherein the mobile carriage moves the camera along a longitudinal axis between an in-use position and a retracted position.

9. The apparatus of claim 8 wherein the valve is a ball valve and blocking the movable carriage from the heat exchanger when the movable carriage is in the retracted position and the ball valve in in the closed orientation.

10. The apparatus of claim 9 wherein carriage moves along a longitudinal axis parallel to and offset from the longitudinal axis of the heat exchanger.

11. An apparatus comprising:
a heat exchanger having a plurality of inner tubes located within an outer tube;
a camera including a borescope having a rod with an optical element on a distal end of the rod; the distal end of the rod being removably received within one of the inner tubes;
a mobile carriage supporting and moving the rod between an in-use position where the distal end of the rod and optical element are within one of the inner tubes and a non in-use position outside of the inner tube;
a first valve and a second valve each movable between an open orientation and a closed orientation respectively, wherein the mobile carriage moves the rod and optical element through the first valve and second valve when the first valve and second valve are in the open orientation, the first valve and second valve are sealing the heat exchanger from the camera when the first valve and second valve are in the closed position and the first valve and second valve are intermediate the optical element and the inner tubes.

12. The apparatus of claim 11, wherein the rod is retracted from the heat exchanger inner tube during aseptic processing of a food product.

13. The apparatus of claim 11, wherein the rod is inserted into the inner tube during a non-aseptic period.

14. The apparatus of claim 11, wherein an o-ring between a rod opening in the heat exchanger through which the rod is removably inserted sealing the rod from the heat exchanger so no air can enter the heat exchanger and no fluid can exit the heat exchanger the through the rod opening.

15. The apparatus of claim 11 further including a light source illuminating an internal surface of one of the inner tubes, wherein the optical element sends an image to the camera.

16. The apparatus of claim 11, including a first valve, a second valve and a spacer therebetween, the rod extending through the first valve, second valve and spacer when the rod is in the in-use position.

17. The apparatus of claim 16, wherein the first valve is at a sterilizing temperature during sterilization of a food product being processed in the heat exchanger.

18. The apparatus of claim 17, wherein the first valve and second valve close in series after the borescope retracts so that the optical element is not inside the heat exchanger tube and does not touch the heat exchanger when processing product, to maintain the aseptic condition.

19. The apparatus of claim 11, including a USB converter transferring the camera's digital image to a display.

20. The apparatus of claim 11, wherein the first valve and second valve are between the distal end of the rod and the inner tube when the borescope is in the non in-use position.

* * * * *